US012282857B1

United States Patent
Qiao et al.

(10) Patent No.: US 12,282,857 B1
(45) Date of Patent: Apr. 22, 2025

(54) RELATIVE MARGIN FOR CONTRASTIVE LEARNING

(71) Applicant: Google LLC, Mountain View, CA (US)

(72) Inventors: Siyuan Qiao, Santa Clara, CA (US);
Chenxi Liu, Santa Clara, CA (US);
Jiahui Yu, Bellevue, WA (US);
Yonghui Wu, Fremont, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/900,506

(22) Filed: Sep. 27, 2024

Related U.S. Application Data (60) Provisional application No. 63/541,254, filed on Sep. 28, 2023.

(51) Int. Cl.
*G06N 3/088* (2023.01)

(52) U.S. Cl.
CPC .................. *G06N 3/088* (2013.01)

(58) Field of Classification Search
None
See application file for complete search history.

(56) References Cited

U.S. PATENT DOCUMENTS

2024/0370718 A1* 11/2024 Panagopoulou ....... G06N 3/045
2024/0386015 A1* 11/2024 Crabtree ............. G06F 16/9024

OTHER PUBLICATIONS

Tan et al. "LXMERT: Learning Cross-Modality Encoder Representations from Transformers", arXiv:1908.07490v3 [cs.CL] Dec. 3, 2019, pp. 14.*
Baltrušaitis et al., "Multimodal machine learning: A survey and taxonomy," IEEE Transactions on Pattern Analysis and Machine Intelligence, Jan. 2018, 41(2):423-443.
Barbu et al., "Objectnet: A large-scale bias-controlled dataset for pushing the limits of object recognition models," Presented at Advances in Neural Information Processing Systems, Vancouver, Canada, Dec. 8-14, 2019; Advances in Neural Information Processing Systems 32, Dec. 2019, 11 pages.
Bommasani et al., "On the Opportunities and Risks of Foundation Models," CoRR, Submitted on Jul. 12, 2022, arXiv:2108.07258v3, 214 pages.
Brown et al., "Language Models are Few-Shot Learners," Presented at the Advances in Neural Information Processing Systems, Vancouver, Canada, Dec. 6-12, 2020; Advances in Neural Information Processing Systems 33, Dec. 2020, 25 pages.
Changpinyo et al., "Conceptual 12M: Pushing Web-Scale Image-Text Pre-Training to Recognize Long-Tail Visual Concepts," Presented at 2021 IEEE/CVF Conference on Computer Vision and Pattern Recognition, Nashville, Tennessee, Jun. 20-25, 2021, pp. 3557-3567.
Chen et al., "A Simple Framework for Contrastive Learning of Visual Representations," Presented at International Conference on Machine Learning, Virtual Conference, Jul. 13-18, 2020, 11 pages.

(Continued)

*Primary Examiner* — Li Wu Chang
(74) *Attorney, Agent, or Firm* — Fish & Richardson P.C.

(57) ABSTRACT

Methods, systems, and apparatus, including computer programs encoded on a computer storage medium, for training neural networks through contrastive learning. In particular, the contrastive learning is modified to use a relative margin to adjust a training pair's contribution to optimization.

18 Claims, 6 Drawing Sheets

(56) References Cited

OTHER PUBLICATIONS

Chen et al., "Encoder-Decoder with Atrous Separable Convolution for Semantic Image Segmentation," Presented at European Conference on Computer Vision, Munchen, Germany, Sep. 8-14, 2018, 18 pages.
Chen et al., "Microsoft COCO Captions: Data Collection and Evaluation Server," CoRR, Submitted on Apr. 3, 2015, arXiv:1504.00325v2, 7 pages.
Cherti et al., "Reproducible scaling laws for contrastive language-image learning," CoRR, Submitted on Dec. 14, 2022, arXiv:2212.07143v1, 39 pages.
Deng et al., "ArcFace: Additive Angular Margin Loss for Deep Face Recognition," Presented at Proceedings of the IEEE/CVF Conference on Computer Vision and Pattern Recognition, Long Beach, California, Jun. 16-20, 2019, pp. 4690-4699.
Devlin et al., "BERT: Pre-training of Deep Bidirectional Transformers for Language Understanding," CoRR, Submitted on Oct. 11, 2018, arXiv:1810.04805v1, 14 pages.
Dosovitskiy et al., "An Image is Worth 16x16 Words: Transformers for Image Recognition at Scale," CoRR, Submitted on Oct. 22, 2020, arXiv:2010.11929v1, 21 pages.
Gadre et al., "DataComp: In search of the next generation of multimodal datasets," CoRR, Submitted on Oct. 20, 2023, arXiv:2304.14108v5, 66 pages.
Goyal et al., "Making the V in VQA Matter: Elevating the Role of Image Understanding in Visual Question Answering," Presented at Proceedings of the IEEE Conference on Computer Vision and Pattern Recognition, Honolulu, Hawaii, Jul. 21-26, 2017, pp. 6325-6334.
He et al., "Deep Residual Learning for Image Recognition," Presented at Proceedings of the IEEE Conference on Computer Vision and Pattern Recognition, Las Vegas, Nevada, Jun. 27-30, 2016, pp. 770-778.
He et al., "Mask R-CNN," Presented at Proceedings of the IEEE International Conference on Computer Vision, Venice, Italy, Oct. 22-29, 2017, pp. 2961-2969.
He et al., "Masked Autoencoders Are Scalable Vision Learners," Presented at Proceedings of the IEEE/CVF Conference on Computer Vision and Pattern Recognition, New Orleans, Louisiana, Jun. 18-24, 2022, pp. 16000-16009.
Hendrycks et al., "The Many Faces of Robustness: A Critical Analysis of Out-of-Distribution Generalization," Presented at Proceedings of the IEEE/CVF International Conference on Computer Vision, Montreal, Canada, Oct. 10-17, 2021, pp. 8340-8349.
Jia et al., "Scaling up Visual and Vision-Language Representation Learning With Noisy Text Supervision," Presented at International Conference on Machine Learning, Honolulu, Hawaii, Jul. 18-24, 2021, 13 pages.
Karpathy et al., "Deep Visual-Semantic Alignments for Generating Image Descriptions," Presented at Proceedings of the IEEE Conference on Computer Vision and Pattern Recognition, Boston, Massachusetts, Jun. 7-12, 2015, 17 pages.
Li et al., "Align before Fuse: Vision and Language Representation Learning with Momentum Distillation," Presented at Advances in Neural Information Processing Systems, Virtual Conference, Dec. 6-14, 2021; Advances in Neural Information Processing Systems 34, Dec. 2021, 12 pages.
Li et al., "BLIP: Bootstrapping Language-Image Pre-training for Unified Vision-Language Understanding and Generation," Presented at International Conference on Machine Learning, Baltimore, Maryland, Jul. 18-23, 2022, 13 pages.
Li et al., "CLIPA-v2: Scaling CLIP Training with 81.1% Zero-shot ImageNet Accuracy within a $10,000 Budget; An Extra $4,000 Unlocks 81.8% Accuracy," Presented at Advances in Neural Information Processing Systems, New Orleans, Louisiana, Dec. 10-16, 2023; CoRR, Submitted on Jun. 27, 2023, arXiv:2306.15658v1, 5 pages.
Li et al., "Scaling Language-Image Pre-Training via Masking," CoRR, Submitted on Dec. 1, 2022, arXiv:2212.00794v1, 12 pages.
Liang et al., "Soft-Margin Softmax for Deep Classification," Presented at Neural Information Processing: 24th International Conference, ICONIP 2017, Guangzhou, China, Nov. 14-18, 2017, 8 pages.
Lin et al., "Microsoft COCO: Common Objects in Context," Presented at Computer Vision-ECCV 2014: 13th European Conference, Zurich, Switzerland, Sep. 6-12, 2014; CoRR, Submitted on Feb. 21, 2015, arXiv:1405.0312v3, 15 pages.
Liu et al., "AdaptiveFace: Adaptive Margin and Sampling for Face Recognition," Presented at Proceedings of the IEEE/CVF Conference on Computer Vision and Pattern Recognition, Long Beach, California, Jun. 15-20, 2019, pp. 11947-11956.
Liu et al., "Large-Margin Softmax Loss for Convolutional Neural Networks," CoRR, Submitted on Dec. 7, 2016, arXiv:1612.02295v1, 10 pages.
Liu et al., "SphereFace: Deep Hypersphere Embedding for Face Recognition," Presented at Proceedings of the IEEE Conference on Computer Vision and Pattern Recognition, Honolulu, Hawaii, Jul. 21-26, 2017, pp. 212-220.
Mao et al., "Deep Captioning with Multimodal Recurrent Neural Networks (m-RNN)," CoRR, Submitted on Dec. 26, 2014, arXiv:1412.6632v2, 17 pages.
Meng et al., "MagFace: A Universal Representation for Face Recognition and Quality Assessment," Presented at Proceedings of the IEEE/CVF Conference on Computer Vision and Pattern Recognition, Nashville, Tennessee, Jun. 20-25, 2021, 14225-14234 pages.
Minderer et al., "Scaling Open-Vocabulary Object Detection," Presented at European Conference on Computer Vision, Tel Aviv, Israel, Oct. 23-24, 2022, 25 pages.
Nichol et al., "GLIDE: Towards Photorealistic Image Generation and Editing with Text-Guided Diffusion Models," CoRR, Submitted Dec. 22, 2021, arXiv:2112.10741v2, 20 pages.
Pham et al., "Combined Scaling for Zero-shot Transfer Learning," CoRR, Submitted on Nov. 19, 2021, arXiv:2111.10050v1, 18 pages.
Plummer et al., "Flickr30k Entities: Collecting Region-to-Phrase Correspondences for Richer Image-to-Sentence Models Supplementary," Presented at Proceedings of the IEEE International Conference on Computer Vision, Santiago, Chile, Dec. 7-13, 2015, pp. 2641-2649.
Prannay et al., "Supervised Contrastive Learning," Presented at the Advances in Neural Information Processing Systems, Vancouver, Canada, Dec. 6-12, 2020; Advances in Neural Information Processing Systems 33, Dec. 2020, 13 pages.
Pratt et al., "What does a platypus look like? Generating customized prompts for zero-shot image classification," CoRR, Submitted on Sep. 7, 2022, arXiv:2209.03320v1, 23 pages.
Radford et al., "Learning Transferable Visual Models From Natural Language Supervision," Presented at International Conference on Machine Learning, Honolulu, Hawaii, Jul. 18-24, 2021, 16 pages.
Raffel et al., "Exploring the Limits of Transfer Learning with a Unified Text-to-Text Transformer," The Journal of Machine Learning Research, Jun. 2020, 21(140):5485-5551.
Ramesh et al., "Hierarchical Text-Conditional Image Generation with CLIP Latents," CoRR, Submitted on Apr. 13, 2022, arXiv:2204.06125v1, 27 pages.
Ramesh et al., "Zero-Shot Text-to-Image Generation," Presented at International Conference on Machine Learning, Honolulu, Hawaii, Jul. 18-24, 2021, 11 pages.
Recht et al., "Do ImageNet Classifiers Generalize to ImageNet?" Presented at International Conference on Machine Learning, Long Beach, California, Jun. 9-15, 2019, 12 pages.
Rombach et al., "High-Resolution Image Synthesis with Latent Diffusion Models," Presented at Proceedings of the IEEE/CVF Conference on Computer Vision and Pattern Recognition, New Orleans, Louisiana, Jun. 18-24, 2022, pp. 10684-10695.
Russakovsky et al., "ImageNet Large Scale Visual Recognition Challenge," International Journal of Computer Vision, Mar. 2015, 115:211-252.
Saharia et al., "Photorealistic Text-to-Image Diffusion Models with Deep Language Understanding," Presented at Advances in Neural

(56) References Cited

OTHER PUBLICATIONS

Information Processing Systems, Virtual Conference, New Orleans, Louisiana, Dec. 6-14, 2022; Advances in Neural Information Processing Systems 35, Dec. 2022, 16 pages.

Schuhmann et al., "LAION-5B: An open large-scale dataset for training next generation image-text models," CoRR, Submitted on Oct. 16, 2022, arXiv:2210.08402v1, 50 pages.

Sharma et al., "Conceptual Captions: A Cleaned, Hypernymed, Image Alt-text Dataset for Automatic Image Captioning," Presented at Proceedings of the 56th Annual Meeting of the Association for Computational Linguistics, Melbourne, Australia, Jul. 15-20, 2018, pp. 2556-2565.

Shrivastava et al., "Training Region-Based Object Detectors with Online Hard Example Mining," Presented at Proceedings of the IEEE Conference on Computer Vision and Pattern Recognition, Las Vegas, Nevada, Jun. 27-30, 2016, pp. 761-769.

Singh et al., "FLAVA: A Foundational Language and Vision Alignment Model," Presented at Proceedings of the IEEE/CVF Conference on Computer Vision and Pattern Recognition, New Orleans, Louisiana, Jun. 18-24, 2022; CoRR, Submitted on Mar. 29, 2022, arXiv:2112.04482v3, 17 pages.

Tay et al., "UL2: Unifying Language Learning Paradigms," Presented at the Eleventh International Conference on Learning Representations, Virtual Conference, Apr. 25-29, 2022, 33 pages.

Thomee et al., "YFCC100M: The New Data in Multimedia Research," Communications of the ACM, Feb. 2016, 59(2):64-73.

Vaswani et al., "Attention Is All You Need," Presented at Advances in Neural Information Processing Systems, Long Beach CA, Dec. 4-9, 2017; Advances in Neural Information Processing Systems 30, Dec. 2017, 11 pages.

Wang et al., "Additive Margin Softmax for Face Verification," IEEE Signal Processing Letters, Jul. 2018, 25(7):926-930.

Wang et al., "CosFace: Large Margin Cosine Loss for Deep Face Recognition," Presented at Proceedings of the IEEE Conference on Computer Vision and Pattern Recognition, Salt Lake City, Utah, Jun. 18-23, 2018, pp. 5265-5274.

Wang et al., "Learning Robust Global Representations by Penalizing Local Predictive Power," Presented at Advances in Neural Information Processing Systems, Vancouver Canada, Dec. 8-14, 2019; Advances in Neural Information Processing Systems 32, Dec. 2019, 13 pages.

Xie et al., "Self-training with Noisy Student improves ImageNet classification," Presented at Proceedings of the IEEE/CVF Conference on Computer Vision and Pattern Recognition, Seattle, Washington, Jun. 13-19, 2020, pp. 10687-10698.

Yang et al., "Unified Contrastive Learning in Image-Text-Label Space," Presented at Proceedings of the IEEE/CVF Conference on Computer Vision and Pattern Recognition, New Orleans, Louisiana, Jun. 19-24, 2022, pp. 19163-19173.

Yao et al., "FILIP: Fine-grained Interactive Language Image Pre-Training," CoRR, Submitted on Nov. 9, 2021, arXiv:2111.07783v1, 18 pages.

Yu et al., "CoCa: Contrastive Captioners are Image-Text Foundation Models," CoRR, Submitted on Jun. 14, 2022, arXiv:2205.01917v2, 19 pages.

Yu et al., "Scaling Autoregressive Models for Content-Rich Text-to-Image Generation," CoRR, Submitted on Jun. 22, 2022, arXiv:2206.10789v1, 49 pages.

Yuan et al., "Florence: A New Foundation Model for Computer Vision," CoRR, Submitted on Nov. 22, 2021, arXiv:2111.11432v1, 17 pages.

Zhai et al., "LiT: Zero-Shot Transfer with Locked-image text Tuning," Presented at Proceedings of the IEEE/CVF Conference on Computer Vision and Pattern Recognition, New Orleans, Louisiana, Jun. 18-24, 2022, pp. 18123-18133.

Zhai et al., "Scaling Vision Transformers," Presented at Proceedings of the IEEE/CVF Conference on Computer Vision and Pattern Recognition, New Orleans, Louisiana, Jun. 18-24, 2022, pp. 12104-12113.

Zhou et al., "Dynamic Margin Softmax Loss for Speaker Verification," Presented at Interspeech, Shanghai, China, Oct. 25-29, 2020, pp. 3800-3804.

Zoph et al., "Neural Architecture Search with Reinforcement Learning," CoRR, Submitted on Nov. 5, 2016, arXiv:1611.01578v1, 15 pages.

\* cited by examiner

| Model | Margin | MSCOCO (5K Test Set) | | | | | | Flickr30K (1K Test Set) | | | | | |
|---|---|---|---|---|---|---|---|---|---|---|---|---|---|
| | | Image → Text | | | Text → Image | | | Image → Text | | | Text → Image | | |
| | $\alpha$ | R@1 | R@5 | R@10 | R@1 | R@5 | R@10 | R@1 | R@5 | R@10 | R@1 | R@5 | R@10 |
| ViT-B | 0.0 | 56.9 | 80.0 | 87.4 | 39.1 | 65.0 | 74.7 | 84.2 | 97.2 | 98.8 | 67.7 | 89.3 | 93.7 |
| ViT-B | 0.1 | 57.8 | 81.8 | 88.8 | 40.1 | 65.9 | 75.7 | 87.3 | 97.7 | 99.0 | 68.9 | 89.5 | 94.2 |
| ViT-B | 0.2 | 58.2 | 82.0 | 88.6 | 40.6 | 66.3 | 75.9 | 87.5 | 98.0 | 98.9 | 70.4 | 90.1 | 94.5 |
| ViT-B | 0.3 | 58.5 | 81.2 | 88.2 | 40.4 | 65.8 | 75.5 | 86.3 | 97.6 | 99.3 | 69.4 | 89.2 | 94.0 |
| ViT-B | 0.4 | 57.0 | 81.1 | 88.8 | 40.2 | 65.5 | 75.0 | 86.0 | 98.0 | 99.1 | 68.1 | 89.0 | 93.5 |
| ViT-B | 0.5 | 56.4 | 80.4 | 87.6 | 38.3 | 63.6 | 73.2 | 85.7 | 96.8 | 98.7 | 66.1 | 88.0 | 92.2 |

FIG. 5

| Model | Margin α | ImageNet | ImageNet-R | ImageNet-V2 | ImageNet-Sketch | ObjectNet | Average |
|---|---|---|---|---|---|---|---|
| ViT-B | 0.0 | 64.5 | 75.3 | 57.4 | 52.3 | 54.4 | 60.8 |
| ViT-B | 0.1 | 66.9 | 77.8 | 58.9 | 54.1 | 55.2 | 62.6 |
| ViT-B | 0.2 | 67.7 | 79.1 | 59.6 | 55.2 | 55.5 | 63.4 |
| ViT-B | 0.3 | 68.2 | 79.3 | 59.8 | 55.3 | 55.5 | 63.6 |
| ViT-B | 0.4 | 67.7 | 78.9 | 59.4 | 55.2 | 54.3 | 63.1 |
| ViT-B | 0.5 | 66.6 | 77.5 | 58.4 | 54.6 | 52.6 | 61.9 |

FIG. 6

RELATIVE MARGIN FOR CONTRASTIVE LEARNING

CROSS REFERENCE TO RELATED APPLICATIONS

This application is a non-provisional of and claims priority to U.S. Provisional Patent Application No. 63/541,254, filed on Sep. 28, 2023, the entire contents of which are hereby incorporated by reference.

BACKGROUND

This specification relates to processing data using machine learning models.

Machine learning models receive an input and generate an output, e.g., a predicted output, based on the received input. Some machine learning models are parametric models and generate the output based on the received input and on values of the parameters of the model.

Some machine learning models are deep models that employ multiple layers of models to generate an output for a received input. For example, a deep neural network is a deep machine learning model that includes an output layer and one or more hidden layers that each apply a non-linear transformation to a received input to generate an output.

SUMMARY

This specification describes techniques for training a dual encoder machine learning model using contrastive learning to perform downstream tasks such as a detection task (e.g., object detection in images based on a text prompt, object detection in images based on an audio prompt, etc.) or a generation task (e.g., image generation from audio data, document generation from a text prompt, audio generation from an audio prompt, image generation from a text prompt, caption generation from an image, audio generation from an image, etc.).

According to a first aspect, there is provided a method performed by one or more computers and for training a first encoder neural network having first encoder neural network parameters and configured to process a first input to generate an first embedding of the first input in an embedding space and a second encoder neural network having second encoder neural network parameters and configured to process a second input to generate a second embedding of the second input in the embedding space, the method comprising: obtaining a batch of training pairs, each training pair including a first input of a first modality and a second input of a second modality; processing each first input in each training pair through the first encoder neural network in accordance with current values of the first encoder neural network parameters to generate a respective first embedding of each first input; processing each second input through the second encoder neural network in accordance with current values of the second encoder neural network parameters to generate a respective second embedding of each second input; determining a plurality of positive similarity scores, each positive similarity score corresponding to one of the training pairs and measuring a similarity between the first embedding in the training pair and the second embedding in the training pair; determining a plurality of negative similarity scores, each negative similarity score corresponding to a respective first training first input and a respective other second input that is not in a same training pair as the respective first training first input and measuring a similarity between the first embedding of the respective first training input and the second embedding of the respective other second input; determining, for each positive similarity score, a relative margin based on (i) the positive similarity score and (ii) an average of the positive and negative similarity scores; determining, for each positive similarity score, an adjusted positive similarity score based on the positive similarity score and the relative margin for the positive similarity score; and training the first encoder neural network on a contrastive loss function applied to the (i) adjusted positive similarity scores and (ii) the negative similarity scores.

In some implementations, the method further comprising training the second encoder neural network on the contrastive loss function applied to the (i) adjusted positive similarity scores and (ii) the negative similarity scores.

In some implementations the first encoder neural network is an image encoder neural network, and the first input of a first modality is an input image.

In some implementations, the second encoder neural network is a text encoder neural network, and the second input of a second modality is an input text segment.

In some implementations the first encoder neural network and the second encoder neural network are jointly trained.

In some implementations, the positive and negative similarity scores measure a cosine similarity.

In some implementations, determining, for each positive similarity score, a relative margin based on (i) the positive similarity score and (ii) an average of the positive and negative similarity scores comprises: subtracting the average of the positive and negative similarity scores from the positive similarity score.

In some implementations determining, for each positive similarity score, an adjusted positive similarity score based on the positive similarity score and the relative margin for the positive similarity score comprises: subtracting, from the positive similarity score, the output of a monotonically increasing function of the relative margin from the positive similarity score.

In some implementations, the monotonically increasing function is a linear function.

In some implementations, the linear function is a product between (i) a scaling factor and (ii) the relative margin.

In some implementations, the method further comprises using at least a portion of the first encoder neural network, the second encoder neural network, or both to perform a downstream task.

In some implementations, the method further comprises fine-tuning a task neural network that includes at least a portion of the first encoder neural network, the second encoder neural network, or both on training data for the downstream task.

The subject matter described in this specification can be implemented in particular embodiments so as to realize one or more of the following advantages.

The system described in this specification can perform contrastive pretraining i.e., the system can "contrastively" pre-train a first encoder neural network and a second encoder neural network of a machine learning model to learn a representation of a first input modality (e.g., images) and a second input modality (e.g., text) in a shared embedding space based on a contrastive loss, e.g., such that embeddings of the first modality and of the second modality that are semantically similar tend to be closer in the embedding space. The contrastive loss encourages the alignment of actual pairs of a first input modality and a second input modality to stand out against wrong pairs, essentially creating a separation between them. Contrastively pre-training the first encoder neural network and the second encoder neural network can greatly increase the downstream performance of the first encoder neural network and the second encoder neural network on tasks for which insufficient training data may be available.

Conventional contrastive pre-training methods are limited by vanishing gradients. The gradients of input pairs drop off quickly for pairs with high separations, resulting in little contribution to optimization from higher-separation pairs. To account for this, the system described herein applies a margin to higher-separation training pairs to rebalance the gradient strength. The system uses a relative alignment score as a separation indicator and incorporates a linear margin function to adaptively increase a pair's contribution to optimization during training. As a result, applying a margin to higher-separation pairs improves the accuracy of the training relative to conventional techniques as more higher-separation pairs contribute toward optimization. This can result in an improvement in the performance of a downstream task, particularly in a low-shot setting.

The performance of conventional contrastive pre-training methods can be limited by noisy data, e.g., web-scale data can include incorrect examples as well as difficult examples. When performing contrastive learning, conventional raining systems can focus on examples with low separation, which can be beneficial when all training data is accurate. However, when training examples include incorrect data, incorrect pairings can contribute to optimization while gradients from correct pairings vanish, harming the performance of the model. Using a relative margin to adjust a pair's contribution to optimization as described in this specification allows the system to significantly improve performance on zero-shot applications when using web-scale training examples e.g., where there are not enough accurately labelled training examples available or when the training examples include a significant amount of noisy data.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
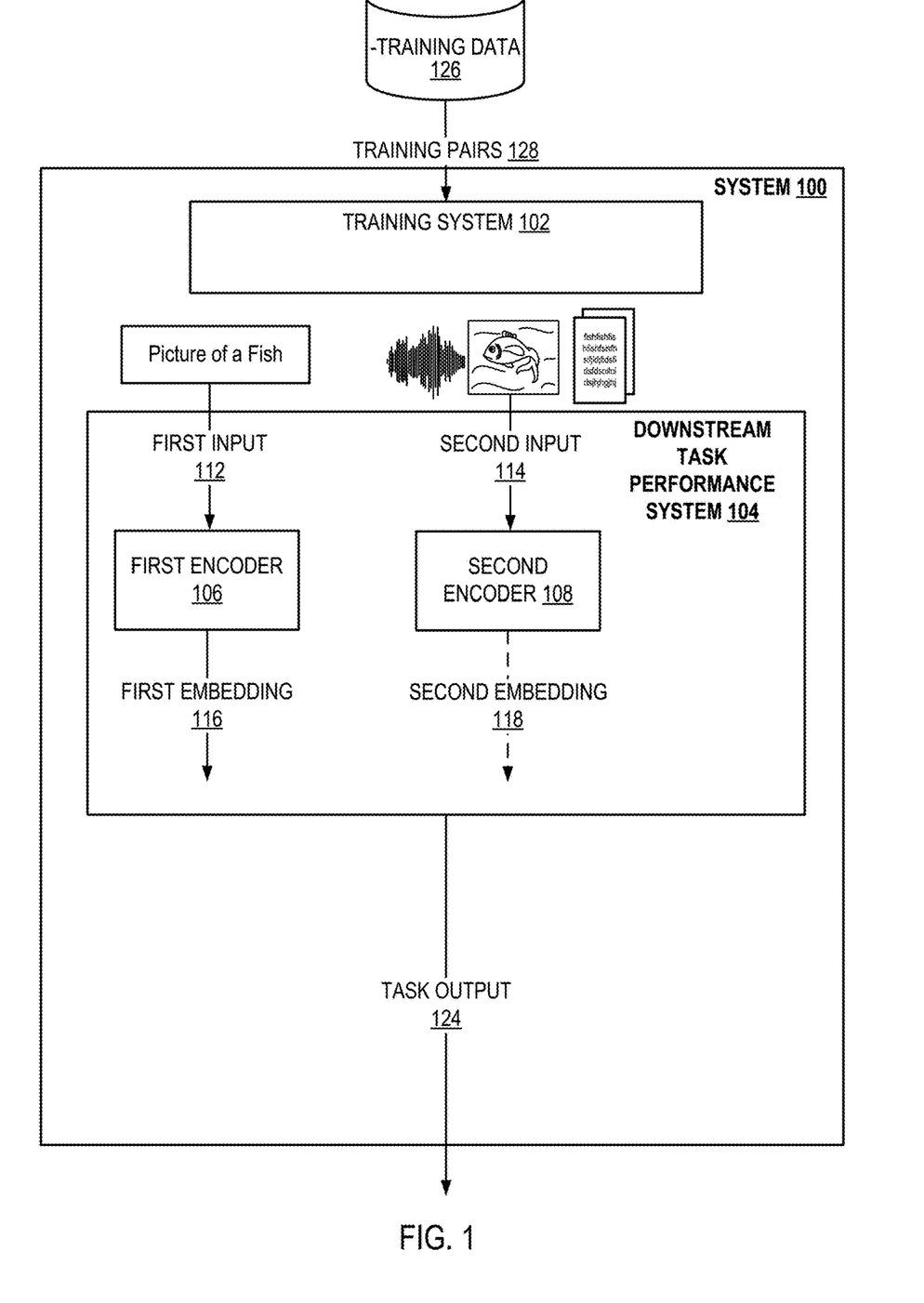
FIG. 1 is a block diagram of an example system.

FIG. 1 shows an example system 100. The system 100 is an example of a system implemented as computer programs on one or more computers in one or more locations in which the systems, components, and techniques described below are implemented.

The system 100 is configured to perform a downstream task. Generally, examples of downstream tasks can include language modeling, image captioning, visual question answering, open vocabulary recognition, cross-modal retrieval, and so on. In particular, the system 100 is configured to generate a task output 124 that includes one or more second inputs 114 that are most relevant to a first input 112.

Generally, the second inputs 114 can be any variety of data items of a variety of different modalities, such as a text document, an image, a video, an audio signal, or a multimodal data item that includes data of two or more modalities, e.g., two or more of text, image, audio, or video.

Similarly, the first input 112 can be any of a variety of data of any of a variety of different modalities, e.g., a text query, an image query, a video query, an audio query, or a multimodal query that includes data of two or more modalities, e.g., two or more of text, image, audio, or video.

When the downstream task is a language modeling task, the input is a text segment that represents text that has already been written and the output is a text segment that represents a next portion of the input text segment.

When the downstream task is an image captioning task, the input is an image and the output is a text caption that describes the content of the image.

When the downstream task is a visual question answering task, the input is an image and a text segment that describes a question about the image and the output is a text segment that describes an answer to the question.

When the downstream task is an open vocabulary recognition task, the input is an image and the output is text that describes the coordinates of one or more regions of the image and a respective label for each of the one or more regions.

When the downstream task is a cross-modal retrieval task, the input is query of one modality (e.g., audio, video, text, etc.) and the output is a data item of a different modality that is aligned with the query. For example, the query can be a text/audio query requesting an image/video with a specified content (e.g., an image containing a particular object, an image containing a particular scene, or the like), and the output is one or more images containing and/or related to the specified content.

FIG. 1 shows that both a first encoder neural network 106 and a second encoder neural network 108 are used to perform the downstream task. However, in practice, using both encoder neural networks is not required. In some cases, the downstream task can use only the first encoder neural network 106 or only the second encoder neural network 108. Moreover, the encoder neural network that is used to perform the downstream task can be trained further prior to using the encoder neural network for the downstream task.

The system 100 includes a training system 102 and a downstream task performance system 104.

After training, the downstream task performance system 104 is configured to generate the task output 124 in response to the first input 112.

The downstream task performance system 104 includes a first encoder neural network 106 configured to generate a first embedding 116 by processing the first input 112 and a second encoder neural network 108 configured to generate a second embedding 118 by processing each of the second inputs 114.

In particular, the system 104 uses the second encoder 108 to generate multiple second embeddings 118 each corresponding to a respective one of the second inputs 114. For example, the system 104 can use the second encoder 108 to generate the second embeddings 118 offline after training is completed and before new first inputs are processed by the system 104.

The second embeddings 118 can be ordered collections of numeric values (e.g., a vector or matrix of floating point or other numeric values that represents the target data item 114).

Each second embedding 118 is generally an embedding in a particular embedding space. An "embedding space" is the space of embeddings having a specified dimensionality, e.g., the space of vectors that have a specified number of entries.

The second encoder 108 can be any appropriate neural network that can map a data item of a particular type to an embedding. For example, the second encoder 108 can be a Transformer, a convolutional neural network, a vision Transformer, or a recurrent neural network.

The system 104 stores the second embeddings 118 in a data structure that is configured to allow the second embeddings 118 to be searched. For example, the data structure can be an index.

The system can then receive the first input 112. In particular, the first input 112 can be a new input submitted by a user of the system. For example, a user can submit the first input 112 by inputting the first input into a user interface.

In some examples, the first input can be a text input for a general retrieval task. For example, the text input can be "Picture of a Fish." The task output can be an image depicting a fish.

In some other examples, the first input can be an image input for a captioning task. For example, the image input can be a photo of a dog. The task output can be a caption that reads "Dog".

In some other examples, the first input can be a text input for an audio generation task. For example, the text input can be "sad melody in a minor key". The task output can be an audio output of a melody in a minor key.

In some other examples, the first input can be a text input for a video generation task. For example, the text input can be "fish swimming". The task output can be a video output depicting a fish swimming.

In some other examples, the first input can be a text input for a text generation task. For example, the text input can be "the history of marbles". The task output can be a text document that described the history of marbles.

In some other examples, the first input can be a query for a relatively specialized retrieval task of a particular relevant output, such as whether the data item is positive or negative or the length/size of the data item. For example, the query can be "Positive Review of Donuts" or "Long Description of Donuts."

The system can generate a first embedding 116 by processing the first input 112 using the first encoder 106.

The first embedding 116 can be an ordered collection of numeric values (e.g., a vector or matrix of floating point or other numeric values that represents the first input 112) that has the same dimensionality as the second embeddings, i.e., that is in the same embedding space as the second embeddings.

The first encoder 106 can be any appropriate neural network that can map the first input to an embedding. For example, the first encoder 106 can be a Transformer, a convolutional neural network, a vision Transformer, or a recurrent neural network.

As will be described below, the first encoder 106 can be pre-trained jointly with the item encoder 108 (e.g., through contrastive learning).

Based on the first embedding 116, the system 100 can select one or more second embeddings 118 that correspond to one or more relevant second inputs 114.

In particular, the system can perform a search to identify one or more second embeddings 118 that are closest to the first embedding 116 according to a similarity measure, e.g., cosine similarity, Euclidean distance, and so on. For example, the system can perform a k-nearest neighbor search or an approximate k-nearest neighbor search of the second embeddings 118 to find the second embedding 118 that is closest to the first embedding 116.

The system can then generate the data output 124 including the one or more corresponding relevant second inputs 114 for the particular task. For example, the system can provide the task output 124 for presentation to a user or to another system that submitted the first input. In some examples, the generating the data output 124 comprises inputting the first embedding and/or one or more second embeddings into a further neural network model, which processes the first embedding and one or more second embeddings to generate the task output 124.

Prior to using the encoder neural networks to generate task outputs, the training system 102 trains the encoder neural networks through contrastive learning.

More specifically, the training system trains the neural networks using training pairs 128 from a set of training data 126.

Each training pair 128 includes a training first input of a first modality and a training second input of a second modality, i.e., a second input that has been determined to be relevant to the training first input.

Unlike conventional systems, the training system 102 uses a relative margin that adjusts a training pair's contribution to optimization to modify the contrastive loss function that the system 102 uses for the training.

Conventional contrastive pre-training methods are limited by vanishing gradients. The gradients of input training pairs drop off quickly for pairs with high separations, resulting in little contribution to optimization from higher-separation pairs. The system applies a margin to higher-separation training pairs to rebalance the gradient strength. The system uses a relative alignment score as a separation indicator and incorporates a linear margin function to adaptively increase a pair's contribution to optimization during training.

More specifically, the system 102 performs the training of the neural networks by performing multiple iterations of a training process.

At each iteration of the training process, the system 102 obtains a batch of training pairs 128. For example, the system 102 can sample the batch from the training data 126.

The system 102 then uses the batch of training pairs 128 to update the parameters of the neural networks using gradients of a contrastive loss function.

This training process will be described in more detail below.

Figure 2:
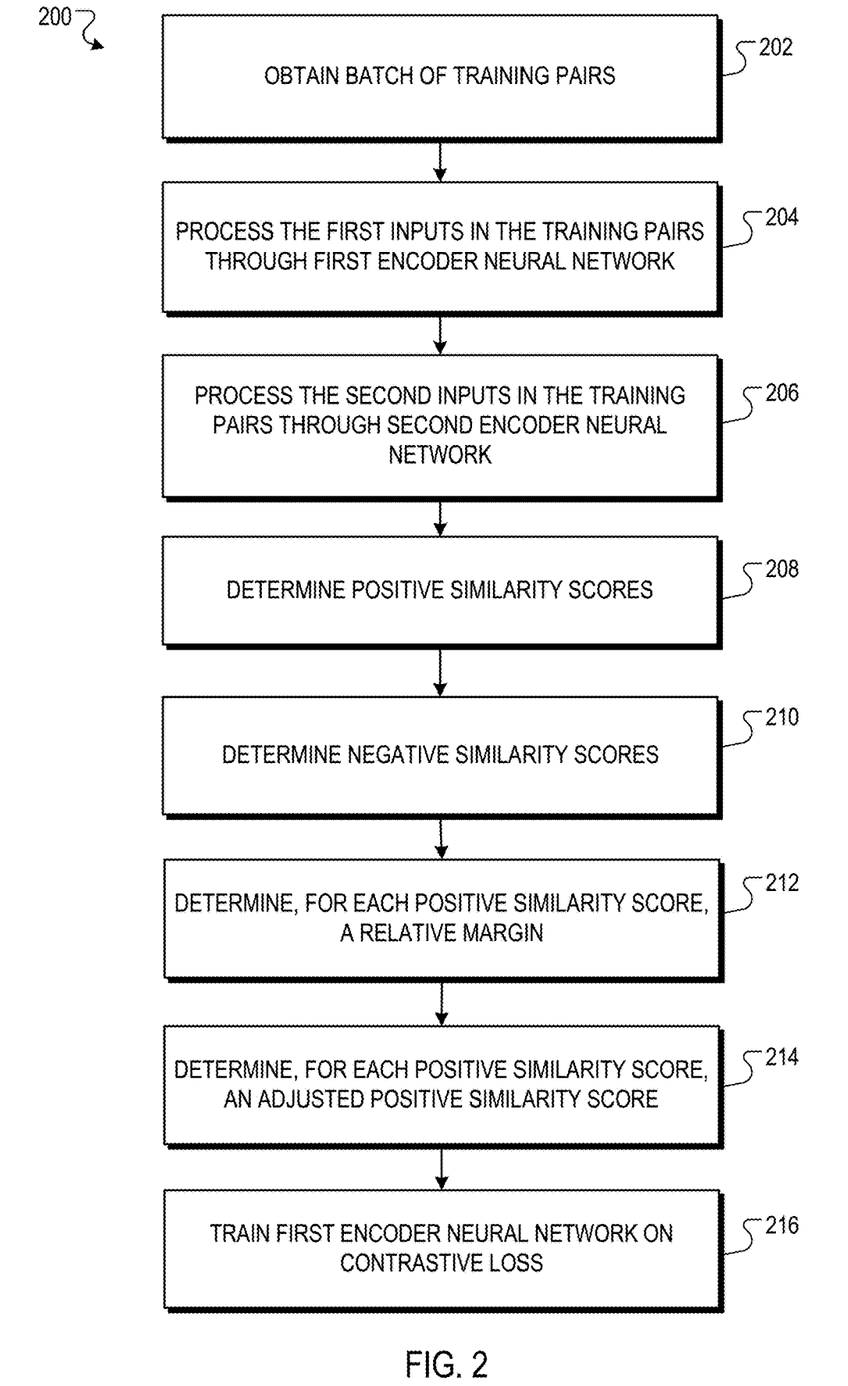
FIG. 2 is a flow diagram of an example process for training the encoder neural networks.

FIG. 2 is a flow diagram of an example process 200 for training a first encoder neural network and a second encoder neural network. For convenience, the process 200 will be described as being performed by a system of one or more computers in one or more locations. For example, a training system, e.g., the training system 102 of FIG. 1, appropriately configured in accordance with this specification, can perform the process 200.

The system can repeatedly perform the process 200 on different batches of training pairs to train the two encoder neural networks jointly.

The system obtains a batch of training pairs, each training pair including a training first input and a training second input (step 202).

The system processes the training first inputs in the training pairs through the first encoder neural network in accordance with current values of the first encoder neural network parameters to generate a respective first embedding of each training first input (step 204).

The system processes each training second input in each training pair through the second encoder neural network in accordance with current values of the second encoder neural network parameters to generate a respective second embedding of each training second input (step 206).

The system determines a plurality of positive similarity scores (step 208). Generally, each positive similarity score corresponds to one of the training pairs and measures a similarity between the first embedding for the first input in the training pair and the second embedding of the training second embedding in the training pair. In other words, the system can generate a respective positive similarity score for each of the training pairs that measures the similarity between the embedding for the training first input in the training pair and the embedding of the training second input in the training pair. For example, the positive similarity score can be a dot product or cosine similarity between the embedding for the training first input in the training pair and the embedding of the training second input in the training pair.

The system determines a plurality of negative similarity scores (step 210).

Each negative similarity score corresponds to a respective first training first input and a respective other second input that is not in the same training pair as the respective first training first input. Each negative similarity score measures a similarity between the first embedding of the respective first training first input and the second embedding of the respective other second input.

For example, the negative similarity score can be a dot product or cosine similarity between the embedding for the respective first training first input and the embedding of the respective other second input.

The system determines, for each positive similarity score, a relative margin based on (i) the positive similarity score and (ii) an average of the positive and negative similarity scores (step 212). That is, the positive similarity score for a given training pair (ii) is the average of a set of scores that includes a) the positive similarity score between the first and second inputs in the pair and b) the negative similarity scores that are between the first input in the pair and second inputs from the other training pairs in the batch. The system can determine the relative margin by subtracting the average of the positive and negative similarity scores from the positive similarity score.

As one example, the relative margin for the positive similarity score for the i-th training pair can be represented as follows:

$$\text{Relative Margin} = z_{i,i} - \frac{1}{N}\sum_{j=1}^{N} z_{i,j},$$

where N represents the number of training pairs, $z_{i,i}$ represents a positive similarity score between the training first input in the pair and the training second input in the pair, and $z_{i,j}$ when $i \neq j$ represents a negative similarity score between the training first input in the pair i and the training second input from another pair j.

The system determines, for each positive similarity score, an adjusted positive similarity score based on the positive similarity score and the relative margin for the positive similarity score (step 214). The system can determine the adjusted positive similarity score by subtracting, from the positive similarity score, the output of a monotonically increasing function of the relative margin. In some examples, the monotonically increasing function can be a linear function. In some cases, the linear function is a product between (i) a scaling factor and (ii) the relative margin from the positive similarity score.

As one example, the adjusted positive similarity score can be represented as follows:

$$z'_{i,i} = z_{i,i} - M(\text{Relative Margin}),$$

where $z'_{i,i}$ represents an adjusted positive similarity score and M (Relative Margin) represents the output of a monotonically increasing function of the relative margin.

As one example, when the monotonically increasing function is a linear function:

$$M(\text{Relative Margin}) = \alpha(\text{Relative Margin}),$$

where $\alpha$ represents a scaling factor.

The system trains the first encoder neural network on a contrastive loss function applied to the (i) the adjusted positive similarity scores and (ii) the negative similarity scores (step 314).

In some implementations, the system trains the second encoder neural network on the contrastive loss function applied to the (i) adjusted positive similarity scores and (ii) the negative similarity scores.

Generally, the contrastive loss function encourages the positive similarity scores to reflect a higher similarity than the negative similarity scores.

The contrastive loss function can be any contrastive loss function such as the contrastive loss functions used in Minderer, Matthias, et al. "Simple open-vocabulary object detection." *European Conference on Computer Vision.* Cham: Springer Nature Switzerland, 2022 or in Chen, Ting, et al. "A simple framework for contrastive learning of visual representations." *International conference on machine learning.* PMLR. 2020 or in Khosla, Prannay, et al. "Supervised contrastive learning." *Advances in neural information processing systems* 33 (2020): 18661-18673. The system described in this specification can use a version of any of these contrastive loss functions that is modified to use the adjusted positive similarity scores instead of the original positive similarity scores as the positives in the loss.

As one example, the contrastive loss can be represented as follows:

$$L_{RM} = \frac{1}{N}\sum_{i=1}^{N} \log\left(\frac{e^{z_{i,i}-\alpha\left(z_{i,i}-\frac{1}{N}\sum_{j=1}^{N}z_{i,j}\right)}}{e^{z_{i,i}-\alpha\left(z_{i,i}-\frac{1}{N}\sum_{j=1}^{N}z_{i,j}\right)} + \sum_{j\neq i} e^{z_{i,j}}}\right).$$

As another example, the contrastive loss can be a combination of, e.g., the sum of, the above loss and the following loss:

$$L_{RM} = \frac{1}{N}\sum_{j=1}^{N} \log\left(\frac{e^{z_{j,j}-\alpha\left(z_{j,j}-\frac{1}{N}\sum_{i=1}^{N}z_{i,j}\right)}}{e^{z_{j,j}-\alpha\left(z_{j,j}-\frac{1}{N}\sum_{i=1}^{N}z_{i,j}\right)} + \sum_{i\neq j} e^{z_{i,j}}}\right).$$

The system can train the neural networks using gradients of the contrastive loss. That is, the system can compute gradients of the contrastive loss with respect to the parameters of the first encoder neural network and the second encoder neural network and then apply an optimizer, e.g., the stochastic gradient descent optimizer, the Adam optimizer, the AdamW optimizer, and so on, to the gradients to update the parameters of the two neural networks.

Optionally, the loss function can also include one or more additional terms, e.g., regularization terms, in addition to a contrastive loss term as described above.

After training the neural networks, the system or another inference system can use at least a portion of the first encoder neural network, the second encoder neural network, or both to perform a downstream task.

For example, the system can fine-tune a task neural network that includes at least a portion of the first encoder neural network, the second encoder neural network, or both on training data for the downstream task. For example, the task neural network can include the first encoder neural network and one or more additional layers that generate the output for the downstream task. As another example, the system can further fine-tune the first encoder, the second encoder, or both before using the neural networks to perform the downstream task.

Figure 3:
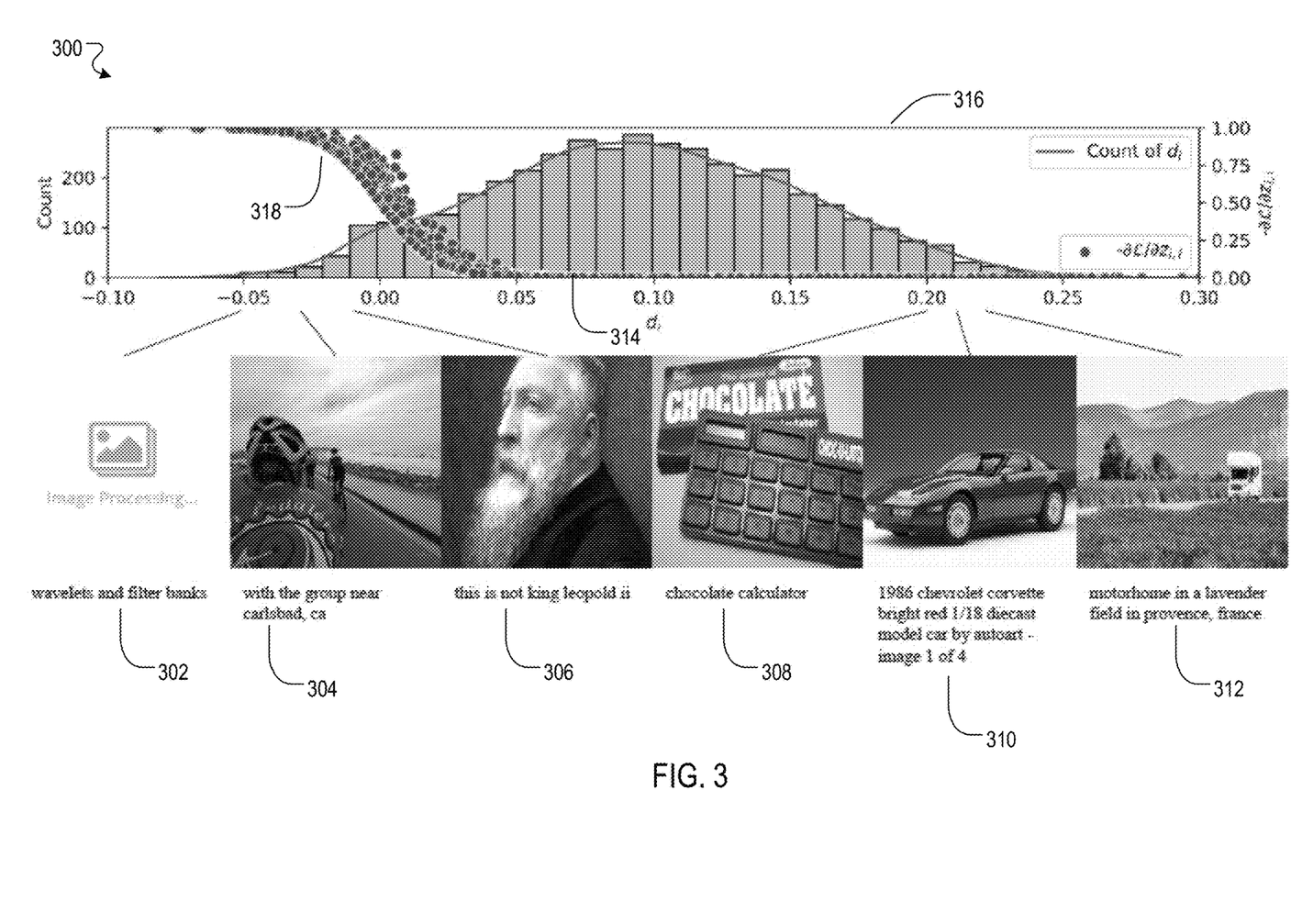
FIG. 3 shows an example of input training pairs and a distribution of the corresponding gradients.

FIG. 3 shows an example 300 of input training pairs and a distribution of the corresponding gradients. The example shows three low separation training pairs 302, 304, and 306 and three high separation training pairs 308, 310, and 312. Each training pair includes an image and an associated description. A high separation training pair is a high quality training pair (i.e., a correct training pair). A low separation training pair is a low quality (i.e., a difficult example) or incorrect training pair (i.e., an irrelevant example).

A system can contrastively pre-train a first encoder neural network and a second encoder neural network of a machine learning model to learn a representation of a first input modality (e.g., images) and a second input modality (e.g., text) in a shared embedding space based on a contrastive loss, e.g., such that embeddings of the first modality and of the second modality that are semantically similar tend to be closer in the embedding space. The contrastive loss encourages the alignment of actual pairs of a first input modality and a second input modality to stand out against wrong pairs, essentially creating a separation between them.

The low separation training pairs include incorrect examples and difficult examples. For example, the training pair 306 is an incorrect example that includes an image of King Leopold ii and an associated description that reads "this is not king leopold II". As another example, the training pair 304 is a difficult example that includes a group of men on a bikes near a body of water and the associated description reads "with the group near carlsbad, ca".

The high separation training pairs include correct and easy examples. For example, the training pair 308 includes and image of a chocolate calculator and the associated description reads "chocolate calculator".

The performance of contrastive pre-training methods can be limited by noisy data e.g., web-scale data can include incorrect examples as well as difficult examples. Training systems can focus on examples with low separation 302, 304, and 306, which can be beneficial when all training data is accurate and the low separation pairs only include difficult examples. However, when training examples include incorrect data, incorrect pairings can contribute to optimization while gradients from correct pairings vanish, harming the performance of the model.

The example includes a graph 316 that shows the distribution 318 of the gradients of the contrastive loss function. Contrastive pre-training methods are limited by vanishing gradients. The gradients of input pairs drop off quickly for pairs with high separations, resulting in little contribution to optimization from higher-separation pairs. The learning is focused on training pairs with separations close to zero. Applying relative margin to higher-separation training pairs allows a training system to adaptively increase a training pair's contribution to optimization during training. This improves the accuracy of the training as more higher-separation pairs can contribute toward optimization.

Figure 4:
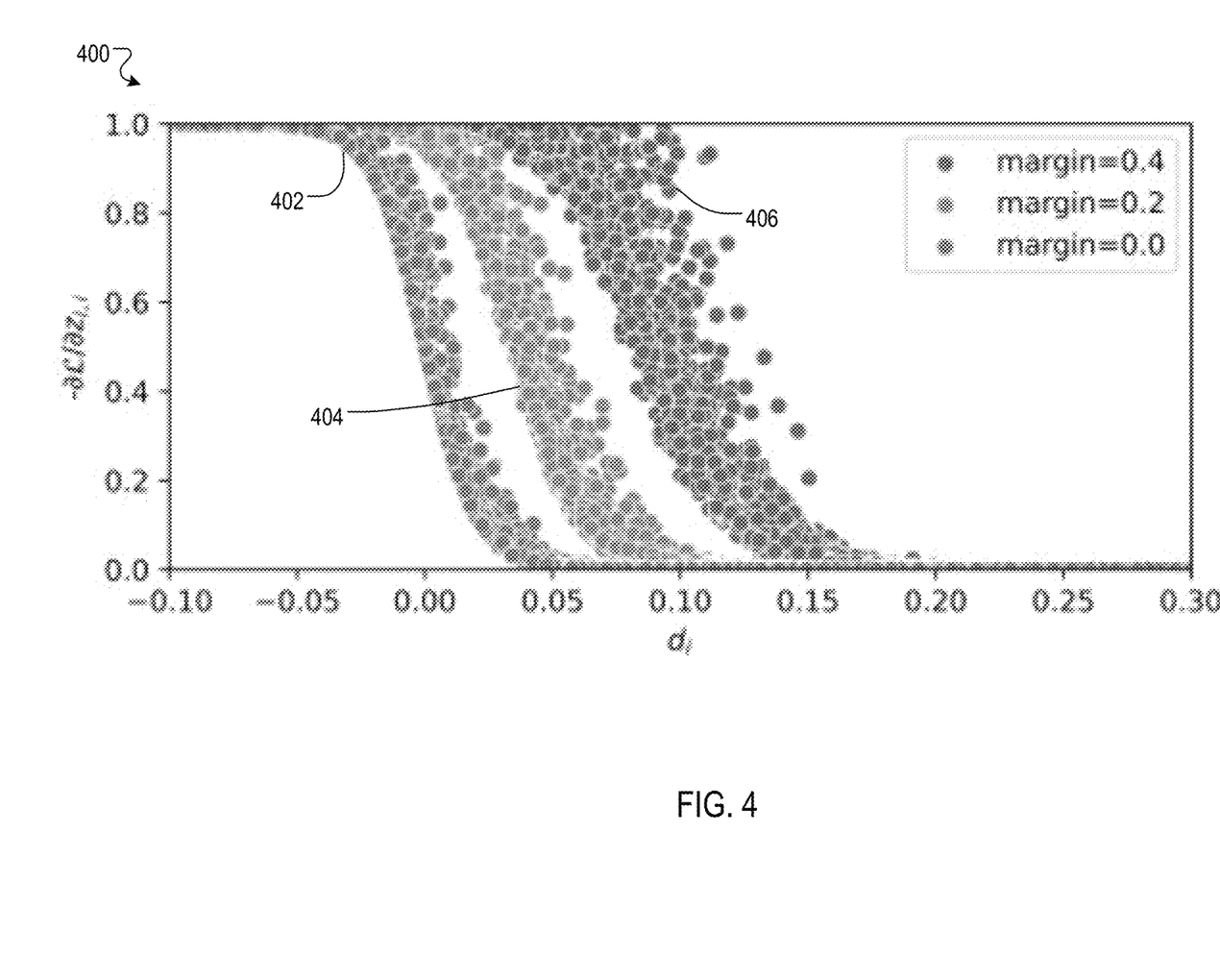
FIG. 4 shows an example of distributions of gradients trained with different margins.

FIG. 4 shows an example 400 of distributions of gradients trained with scaling factor. The example 400 shows a distribution trained without a scaling factor 402, a distribution trained with a 0.2 scaling factor 404, and a distribution trained with a 0.4 scaling factor 406.

A training system can apply a margin to higher-separation training pairs to rebalance the gradient strength when performing a contrastive training process. The system can use a relative alignment score as a separation indicator and incorporate a linear margin function to adaptively increase a pair's contribution to optimization during training. The distribution trained with a 0.4 scaling factor 406 is less skewed (i.e., the left tail is longer) than the distribution trained with a 0.2 scaling factor 404, which is less skewed than the distribution trained without a scaling factor 402. This allows training examples with high separation to contribute more toward optimization during training.

Using a relative margin to adjust a pair's contribution to optimization allows the system to significantly improve performance on zero-shot applications when using web-scale training examples e.g., where there are not enough accurately labelled training examples available or when the training examples include a significant amount of noisy data.

Figure 5:
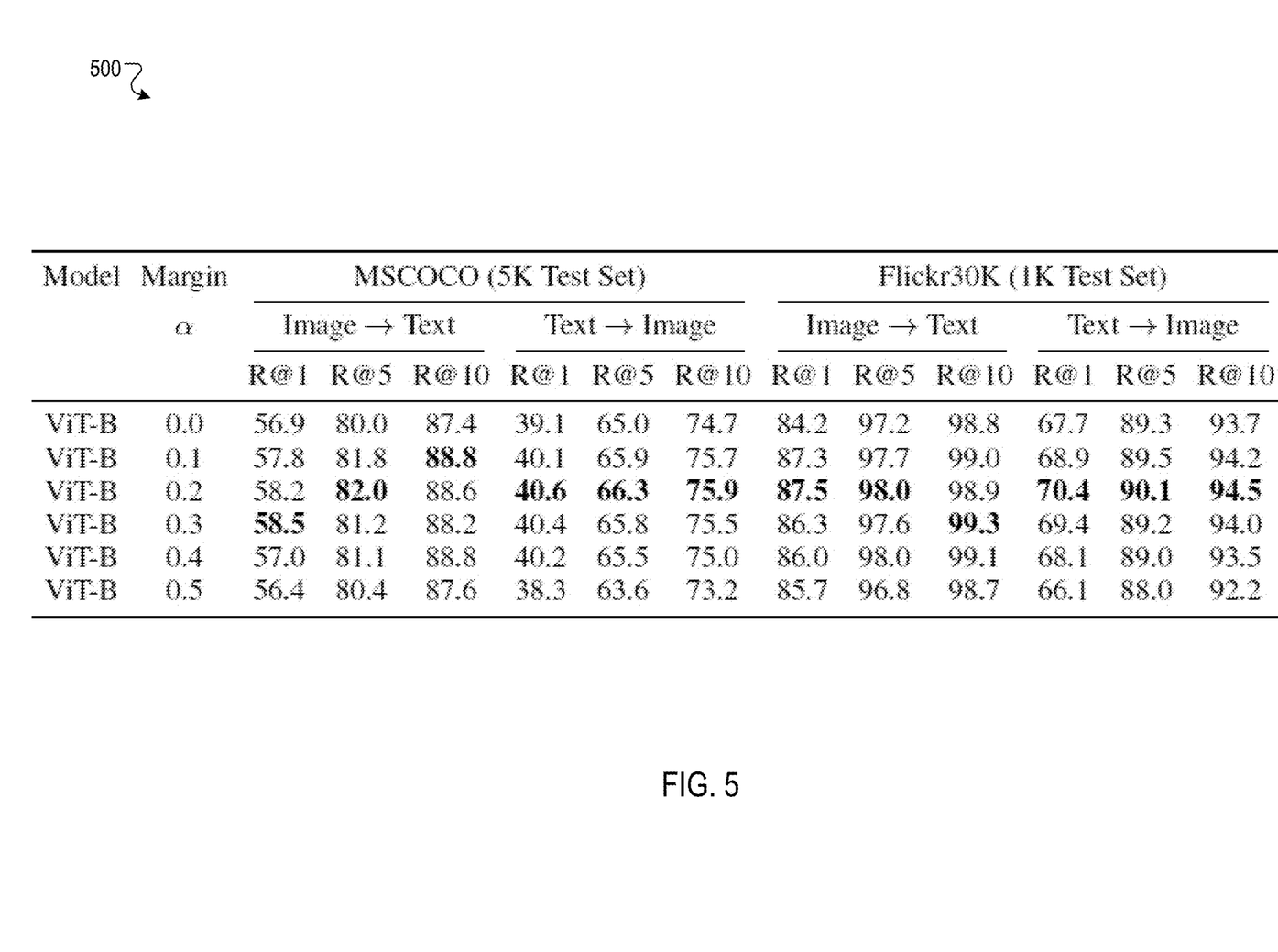
FIG. 5 shows an example of the performance of models trained with different margins.

FIG. 5 shows an example 500 of the performance of models trained with different margins. The example shows the performance of a model on zero-shot image-text retrieval tasks when trained using various scaling factors, including the case where no margin is used (i.e. a scaling factor of 0). The optimal performance for each task occurs when a non-zero scaling factor is used in training, and thus when a relative margin is applied.

Figure 6:
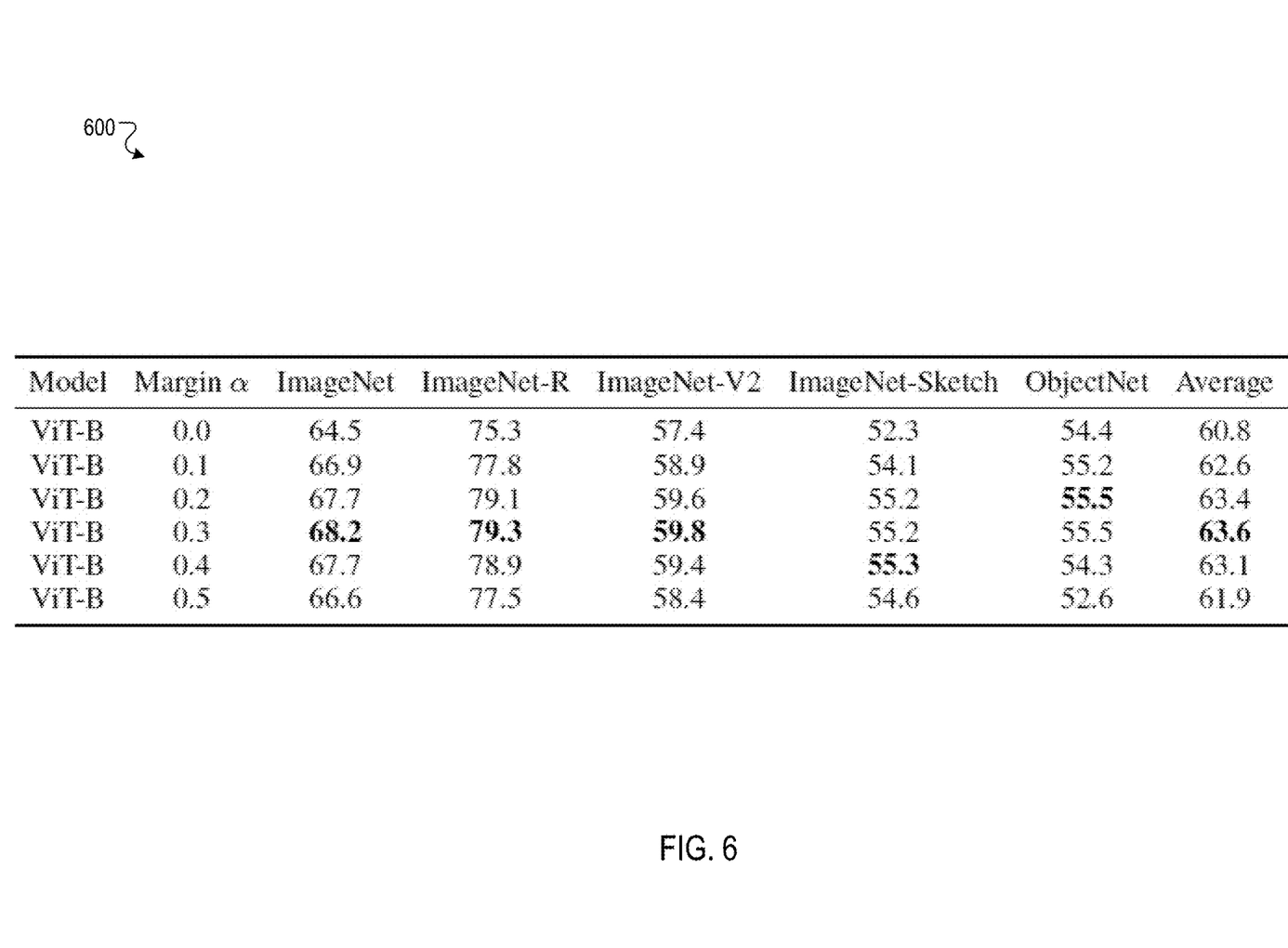
FIG. 6 shows another example of the performance of models trained with different margins.

FIG. 6 shows another example 600 of the performance of models trained with different margins. The example shows the performance of a model on zero-shot image classification tasks when trained using various scaling factors, including the case where no margin is used (i.e. a scaling factor of 0). The optimal performance for each task occurs when a non-zero scaling factor is used in training, and thus when a relative margin is applied.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible storage medium, which may be non-transitory, for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

In this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow or a Jax framework.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network.

Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method performed by one or more computers and for training a first encoder neural network having first encoder neural network parameters and configured to process a first input to generate a first embedding of the first input in an embedding space and a second encoder neural network having second encoder neural network parameters and configured to process a second input to generate a second embedding of the second input in the embedding space, the method comprising:

obtaining a batch of training pairs, each training pair including a first input of a first modality and a second input of a second modality; and training the first encoder neural network and the second encoder neural network on the batch of training pairs, the training comprising:

processing each first input in each training pair through the first encoder neural network in accordance with current values of the first encoder neural network parameters to generate a respective first embedding of each first input in the embedding space;

processing each second input through the second encoder neural network in accordance with current values of the second encoder neural network parameters to generate a respective second embedding of each second input in the embedding space;

determining a plurality of positive similarity scores, each positive similarity score corresponding to one of the training pairs and measuring a similarity between the first embedding in the training pair and the second embedding in the training pair;

determining a plurality of negative similarity scores, each negative similarity score corresponding to a respective first input and a respective other second input that is not in a same training pair as the respective first input and measuring a similarity between the first embedding of the respective first training input and the second embedding of the respective other second input;

determining, for each positive similarity score, a relative margin based on (i) the positive similarity score and (ii) an average of the positive and negative similarity scores;

determining, for each positive similarity score, an adjusted positive similarity score based on the positive similarity score and the relative margin for the positive similarity score; and training the first encoder neural network and the second encoder neural network on a contrastive loss function applied to the (i) adjusted positive similarity scores and (ii) the negative similarity scores.

2. The method of claim 1, wherein the first encoder neural network is an image encoder neural network, and the first input of a first modality is an input image.

3. The method of claim 1, wherein the second encoder neural network is a text encoder neural network, and the second input of a second modality is an input text segment.

4. The method of claim 1, wherein the first encoder neural network and the second encoder neural network are jointly trained.

5. The method of claim 1, wherein the positive and negative similarity scores measure a cosine similarity.

6. The method of claim 1, wherein determining, for each positive similarity score, a relative margin based on (i) the positive similarity score and (ii) an average of the positive and negative similarity scores comprises:

subtracting the average of the positive and negative similarity scores from the positive similarity score.

7. The method of claim 1, wherein determining, for each positive similarity score, an adjusted positive similarity score based on the positive similarity score and the relative margin for the positive similarity score comprises:

subtracting, from the positive similarity score, the output of a monotonically increasing function of the relative margin from the positive similarity score.

8. The method of claim 7, wherein the monotonically increasing function is a linear function.

9. The method of claim 8, wherein the linear function is a product between (i) a scaling factor and (ii) the relative margin.

10. The method of claim 1, wherein the method further comprises using at least a portion of the first encoder neural network, the second encoder neural network, or both to perform a downstream task.

11. The method of claim 10, wherein the method further comprises fine-tuning a task neural network that includes at least a portion of the first encoder neural network, the second encoder neural network, or both on training data for the downstream task.

12. A system comprising:
one or more computers; and
one or more storage devices communicatively coupled to the one or more computers, wherein the one or more storage devices store instructions that, when executed by the one or more computers, cause the one or more computers to perform operations for training a first encoder neural network having first encoder neural network parameters and configured to process a first input to generate a first embedding of the first input in an embedding space and a second encoder neural network having second encoder neural network parameters and configured to process a second input to generate a second embedding of the second input in the embedding space, the operations comprising:
obtaining a batch of training pairs, each training pair including a first input of a first modality and a second input of a second modality; and
training the first encoder neural network and the second encoder neural network on the batch of training pairs, the training comprising:
processing each first input in each training pair through the first encoder neural network in accordance with current values of the first encoder neural network parameters to generate a respective first embedding of each first input in the embedding space;
processing each second input through the second encoder neural network in accordance with current values of the second encoder neural network parameters to generate a respective second embedding of each second input in the embedding space;
determining a plurality of positive similarity scores, each positive similarity score corresponding to one of the training pairs and measuring a similarity between the first embedding in the training pair and the second embedding in the training pair;
determining a plurality of negative similarity scores, each negative similarity score corresponding to a respective first input and a respective other second input that is not in a same training pair as the respective first input and measuring a similarity between the first embedding of the respective first training input and the second embedding of the respective other second input;
determining, for each positive similarity score, a relative margin based on (i) the positive similarity score and (ii) an average of the positive and negative similarity scores;
determining, for each positive similarity score, an adjusted positive similarity score based on the positive similarity score and the relative margin for the positive similarity score; and
training the first encoder neural network and the second encoder neural network on a contrastive loss function applied to the (i) adjusted positive similarity scores and (ii) the negative similarity scores.

13. The system of claim 12, wherein determining, for each positive similarity score, a relative margin based on (i) the positive similarity score and (ii) an average of the positive and negative similarity scores comprises:
subtracting the average of the positive and negative similarity scores from the positive similarity score.

14. The system of claim 13, wherein determining, for each positive similarity score, an adjusted positive similarity score based on the positive similarity score and the relative margin for the positive similarity score comprises:
subtracting, from the positive similarity score, the output of a monotonically increasing function of the relative margin from the positive similarity score.

15. The system of claim 14, wherein the monotonically increasing function is a linear function.

16. The system of claim 15, wherein the linear function is a product between (i) a scaling factor and (ii) the relative margin.

17. The system of claim 12, wherein the positive and negative similarity scores measure a cosine similarity.

18. One or more non-transitory computer storage media storing instructions that when executed by one or more computers cause the one or more computers to perform operations for training a first encoder neural network having first encoder neural network parameters and configured to process a first input to generate a first embedding of the first input in an embedding space and a second encoder neural network having second encoder neural network parameters and configured to process a second input to generate a second embedding of the second input in the embedding space, the operations comprising:
obtaining a batch of training pairs, each training pair including a first input of a first modality and a second input of a second modality; and
training the first encoder neural network and the second encoder neural network on the batch of training pairs, the training comprising:
processing each first input in each training pair through the first encoder neural network in accordance with current values of the first encoder neural network parameters to generate a respective first embedding of each first input in the embedding space;
processing each second input through the second encoder neural network in accordance with current values of the second encoder neural network parameters to generate a respective second embedding of each second input in the embedding space;
determining a plurality of positive similarity scores, each positive similarity score corresponding to one of the training pairs and measuring a similarity between the first embedding in the training pair and the second embedding in the training pair;
determining a plurality of negative similarity scores, each negative similarity score corresponding to a respective first input and a respective other second input that is not in a same training pair as the respective first input and measuring a similarity between the first embedding of the respective first training input and the second embedding of the respective other second input;
determining, for each positive similarity score, a relative margin based on (i) the positive similarity score and (ii) an average of the positive and negative similarity scores;

determining, for each positive similarity score, an adjusted positive similarity score based on the positive similarity score and the relative margin for the positive similarity score; and training the first encoder neural network and the second encoder neural network on a contrastive loss function applied to the (i) adjusted positive similarity scores and (ii) the negative similarity scores.

* * * * *